US012160818B2

(12) United States Patent
Morioka

(10) Patent No.: US 12,160,818 B2
(45) Date of Patent: Dec. 3, 2024

(54) WIRELESS COMMUNICATION DEVICE AND WIRELESS COMMUNICATION METHOD

(71) Applicant: Sony Corporation, Tokyo (JP)

(72) Inventor: Yuichi Morioka, Tokyo (JP)

(73) Assignee: Sony Corporation, Tokyo (JP)

( * ) Notice: Subject to any disclaimer, the term of this patent is extended or adjusted under 35 U.S.C. 154(b) by 497 days.

(21) Appl. No.: 17/272,068

(22) PCT Filed: Aug. 23, 2019

(86) PCT No.: PCT/JP2019/032991
§ 371 (c)(1),
(2) Date: Feb. 26, 2021

(87) PCT Pub. No.: WO2020/050057
PCT Pub. Date: Mar. 12, 2020

(65) Prior Publication Data
US 2021/0329545 A1  Oct. 21, 2021

(30) Foreign Application Priority Data
Sep. 6, 2018 (JP) .................................. 2018-166514

(51) Int. Cl.
*H04W 4/00* (2018.01)
*H04W 8/26* (2009.01)
(Continued)

(52) U.S. Cl.
CPC ............. *H04W 48/20* (2013.01); *H04W 8/26* (2013.01); *H04W 48/16* (2013.01); *H04W 76/10* (2018.02)

(58) Field of Classification Search
CPC ....... H04W 48/20; H04W 48/16; H04W 8/26; H04W 76/10
(Continued)

(56) References Cited

U.S. PATENT DOCUMENTS 10,531,423 B1 *  1/2020  Hassan ................. H04W 64/00
2014/0111313 A1 *  4/2014  Wild .................. G06K 7/10059
340/10.42
(Continued)

FOREIGN PATENT DOCUMENTS

JP    2006-287787 A    10/2006
JP    2013-153485 A     8/2013
(Continued)

OTHER PUBLICATIONS

International Search Report and English translation thereof dated Oct. 15, 2019 in connection with International Application No. PCT/JP2019/032991.
(Continued)

*Primary Examiner* — Temica M Beamer
(74) *Attorney, Agent, or Firm* — Wolf, Greenfield & Sacks, P.C.

(57) ABSTRACT

The present technology relates to a wireless communication device and a wireless communication method that enable easy construction of a network group of access points. The wireless communication device includes: a signal generation unit that, on the basis of a first signal that includes access point identification information for identifying an access point that configures a network group according to a user's instruction, generates a second signal that includes the access point identification information, and includes network identification information for identifying an access-point network group to which the access point makes an entry; and a communication control unit that receives the first signal from the access point, and performs control of transmitting the second signal to the access point. The present technology can be applied to, for example, a station of a communication system that conforms to the standards of IEEE 802.11.

19 Claims, 11 Drawing Sheets

(51) Int. Cl.
*H04W 48/16* (2009.01)
*H04W 48/20* (2009.01)
*H04W 76/10* (2018.01)

(58) Field of Classification Search
USPC .................................................. 370/329
See application file for complete search history.

(56) References Cited

U.S. PATENT DOCUMENTS

| 2015/0131529 | A1* | 5/2015 | Zhou | H04W 40/32 |
| | | | | 370/328 |
| 2016/0295353 | A1 | 10/2016 | Sugimoto | |
| 2017/0094706 | A1 | 3/2017 | Kim | |
| 2017/0150419 | A1 | 5/2017 | Li et al. | |

FOREIGN PATENT DOCUMENTS

| JP | 2016-019103 A | 2/2016 |
| JP | 2017-523639 A | 8/2017 |
| WO | WO-2018118150 A1 | 6/2018 |
| WO | WO 2015/184630 A1 | 12/2018 |

OTHER PUBLICATIONS

International Written Opinion and English translation thereof mailed Oct. 15, 2019 in connection with International Application No. PCT/JP2019/032991.

International Preliminary Report on Patentability and English translation thereof mailed Mar. 18, 2021 in connection with International Application No. PCT/JP2019/032991.

Extended European Search Report for European Application No. 19857823.9 dated Oct. 18, 2021.

* cited by examiner

WIRELESS COMMUNICATION DEVICE AND WIRELESS COMMUNICATION METHOD

CROSS-REFERENCE TO RELATED APPLICATIONS

This application claims the benefit under 35 U.S.C. § 371 as a U.S. National Stage Entry of International Application No. PCT/JP2019/032991, filed in the Japanese Patent Office as a Receiving Office on Aug. 23, 2019, which claims priority to Japanese Patent Application Number JP2018-166514, filed in the Japanese Patent Office on Sep. 6, 2018, each of which is hereby incorporated by reference in its entirety.

TECHNICAL FIELD

The present technology relates to a wireless communication device and a wireless communication method, and in particular relates to a wireless communication device and a wireless communication method that are suitable for being used in a case where a user-intended network group of access points is constructed.

BACKGROUND ART

In recent years, with the spread of systems that conform to the standards of IEEE 802.11 (wireless LAN), there is a case where a plurality of access points (wireless base stations) is installed in a household house. Moreover, for example, there is a case where a user purchases a plurality of access points bundled beforehand, and constructs, in a household house, a Multi-Access Point Network (hereinafter referred to as "MAPN") in which a backhaul can be shared among access points, and handover is possible.

In addition, conventionally, it is proposed that a telecommunications carrier transmits, to an access terminal, a message providing notification of an access point that permits an access to the access point, the access terminal displays identification information of the access point, and a user determines whether or not to enable an access to each access point (refer to, for example, Patent Document 1).

CITATION LIST

Patent Document

Patent Document 1: Japanese Patent Application Laid-Open No. 2013-153485

SUMMARY OF THE INVENTION

Problems to be Solved by the Invention

Meanwhile, in recent years, in addition to the conventional general access points, for example, electronic apparatuses (for example, a TV, etc.), each of which is provided with a function of an access point, and application programs, each of which adds a function of an access point to an electronic apparatus, are achieving widespread use. For example, there is a case where a TV becomes an access point, and the TV delivers video to a mobile device and the like.

In a case where an MAPN that includes such an electronic apparatus is constructed, differently from a case where an MAPN is constructed by access points bundled beforehand, settings by a user is required, and consequently a user's load increases. This point is not sufficiently examined in Patent Document 1.

The present technology has been devised in consideration of such a situation, and an object of the present technology is to enable easy construction of a user-intended network group of access points.

Solutions to Problems

A wireless communication device according to a first aspect of the present technology includes: a signal generation unit that, on the basis of a first signal that includes access point identification information for identifying an access point that configures a network group according to a user's instruction, generates a second signal that includes the access point identification information, and includes network identification information for identifying an access-point network group to which the access point makes an entry; and a communication control unit that receives the first signal from the access point, and performs control of transmitting the second signal to the access point.

A wireless communication method according to the first aspect of the present technology is performed by a wireless communication device, and including: receiving a first signal that includes access point identification information for identifying an access point that configures a network group according to a user's instruction, the first signal being received from the access point; generating a second signal that includes the access point identification information, and includes network identification information for identifying an access-point network group to which the access point makes an entry; and transmitting the second signal to the access point.

A wireless communication device according to a second aspect of the present technology includes: a signal generation unit that generates a first signal that includes access point identification information for identifying the wireless communication device itself that is an access point configuring a network group according to a user's instruction, and includes information indicating whether or not the access point supports the network group; and a communication control unit that performs control of transmitting the first signal to a station.

In the first aspect of the present technology, a first signal that includes access point identification information for identifying an access point that configures a network group according to a user's instruction is received from the access point, a second signal that includes the access point identification information, and includes network identification information for identifying an access-point network group to which the access point makes an entry, is generated, and the second signal is transmitted to the access point.

In the second aspect of the present technology, a first signal that includes access point identification information for identifying the wireless communication device itself that is an access point configuring a network group according to a user's instruction, and includes information indicating whether or not the access point supports the network group, is generated, and the first signal is transmitted to a station.

Effects of the Invention

According to the first or second aspect of the present technology, a network group of access points can be easily constructed.

It should be noted that the effects described herein are not necessarily limited, and may be any one of the effects described in the present disclosure.

MODE FOR CARRYING OUT THE INVENTION

Modes for carrying out the present technology will be described below. The description will be made in the following order.
1. Embodiment
2. Modified example
3. Others 1. Embodiment The present technology is designed to enable easy construction of an MAPN in a wireless communication system that conforms to, for example, the standards of IEEE 802.11 (wireless LAN).

Here, the MAPN is a network group that includes one or more access points. In a case where the MAPN is provided with two or more access points, it is possible to cause the access points to perform cooperative processing therebetween. In addition, contents of the cooperative processing can be arbitrarily set. For example, a backhaul can be shared between access points, or handover can be enabled between access points. It should be noted that an MAPN is not always required to allow cooperative processing to be performed between access points.

Configuration Example of Wireless Communication Device 101

Figure 1:
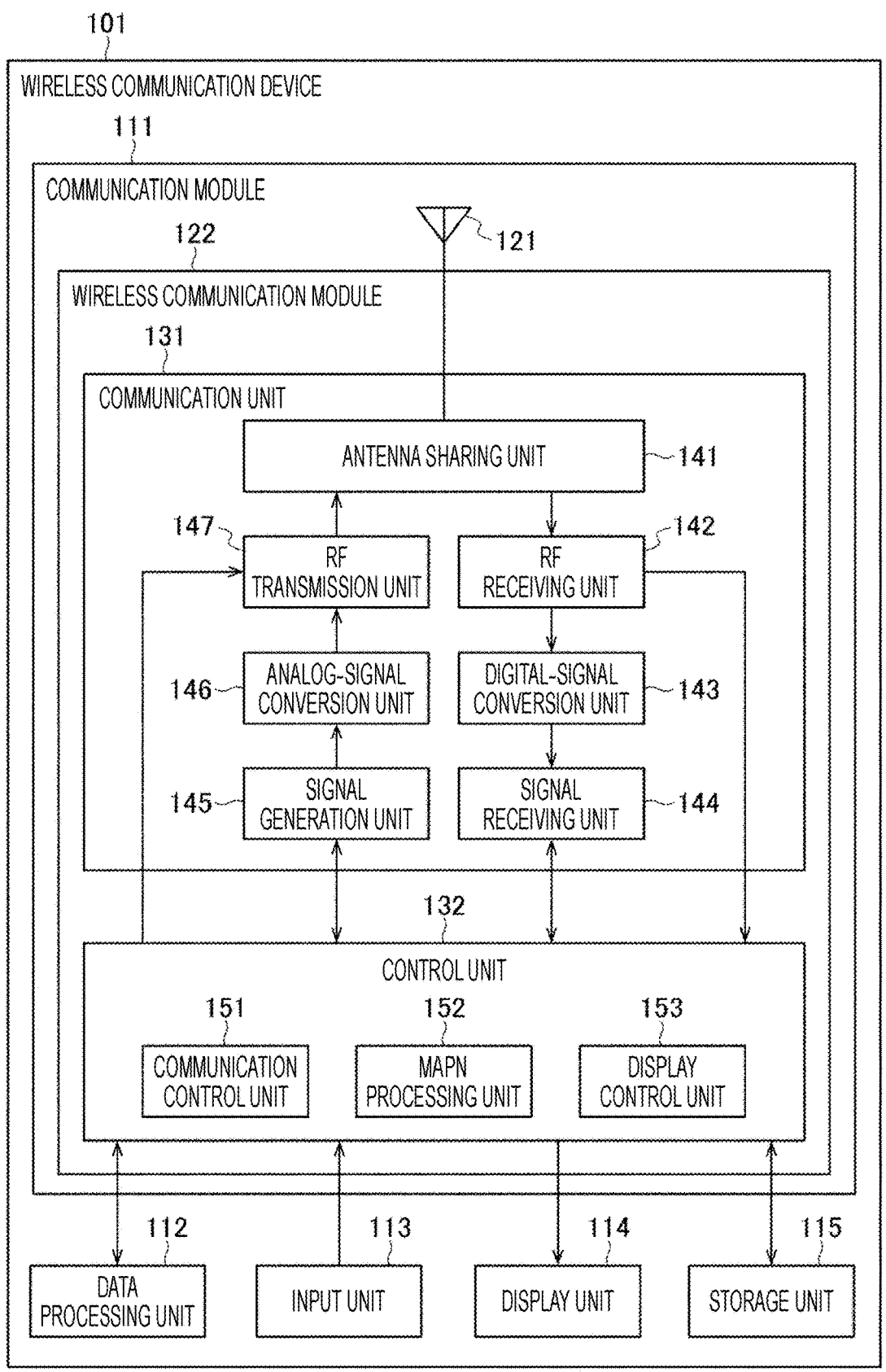
FIG. 1 is a block diagram illustrating a configuration example of a wireless communication device (access point) to which the present technology is applied.

FIG. 1 is a block diagram illustrating a configuration example of the wireless communication device 101 to which the present technology is applied.

The wireless communication device 101 functions as an access point, and wirelessly communicates with other access points and stations.

In addition, the wireless communication device 101 communicates with other servers (not illustrated) or the like through one or more among other access points, a backhaul, and a backbone communication network such as the Internet. It should be noted that in FIG. 1, a part in which the wireless communication device 101 communicates with other servers or the like is omitted.

It should be noted that the wireless communication device 101 may be provided with a function other than the access-point functions. For example, the wireless communication device 101 may be configured by an electronic apparatus such as a TV having an access-point function.

The wireless communication device 101 is provided with a communication module 111, a data processing unit 112, an input unit 113, a display unit 114, and a storage unit 115.

The communication module 111 wirelessly communicates with other access points and stations.

The data processing unit 112 extracts various information from a signal supplied from the communication module 111, and supplies the extracted information, generated information, or the like to the communication module 111.

The input unit 113 is provided with a device that is used by a user to input various data, instructions, and the like. For example, the input unit 113 is provided with an operation device such as a touch panel, a button, a microphone, a switch, and a lever, an operation device that enables inputting by a method other than manual operations, for example, by a voice or a gesture, and the like.

The display unit 114 is provided with a device that is used to display various information. For example, the display unit 114 is provided with a display or the like.

The storage unit 115 stores data or the like required for processing of the communication module 111.

The communication module 111 is provided with an antenna 121, and a wireless communication module 122.

The antenna 121 wirelessly transmits various signals supplied from the wireless communication module 122. In addition, the antenna 121 receives the wirelessly transmitted signals, and then supplies the signals to the wireless communication module 122.

The wireless communication module 122 includes, for example, a semiconductor chip. While giving/receiving information to/from the data processing unit 112, the wireless communication module 122 supplies various kinds of signals to the antenna 121 to cause the antenna 121 to transmit the signals, and performs processing corresponding to a signal received by the antenna 21, as appropriate.

The wireless communication module 122 is provided with a communication unit 131, and a control unit 132.

The communication unit 131 wirelessly communicates with other access points and stations through the antenna 121 under the control of the control unit 132.

The control unit 132 controls, for example, the operation of the whole wireless communication module 122.

The communication unit 131 is provided with an antenna sharing unit 141, an RF receiving unit 142, a digital-signal conversion unit 143, a signal receiving unit 144, a signal generation unit 145, an analog-signal conversion unit 146, and an RF transmission unit 147.

The antenna sharing unit 141 is a switch that switches between transmission and receiving. In other words, the antenna sharing unit 141 supplies the antenna 121 with a signal supplied from the RF transmission unit 147, and supplies the RF receiving unit 142 with a signal supplied from the antenna 121.

The RF receiving unit 142 includes, for example, a low-noise amplifier, an Auto Gain Control (AGC) unit, a frequency converter, and a filter, and receives a signal through the antenna sharing unit 141 by the antenna 121. The RF receiving unit 142 subjects the received signal to various kinds of processing such as amplification processing, gain adjustment processing, frequency conversion processing, and filter processing as appropriate, and then supplies signals obtained as results thereof to the digital-signal conversion unit 143. The RF receiving unit 142 also determines a reception intensity or the like of the received signal as necessary, and supplies the reception intensity or the like to the control unit 132.

The digital-signal conversion unit 143 subjects the signals supplied from the RF receiving unit 142 to Analog Digital (AD) conversion to convert the signals from analog signals to digital signals, and then supplies the digital signals to the signal receiving unit 144.

The signal receiving unit 144 subjects the signals supplied from the digital-signal conversion unit 143 to various kinds of processing such as demodulation and decoding according to control of the control unit 132, and supplies signals obtained as results thereof to the control unit 132.

The signal generation unit 145 performs encoding processing or the like on the basis of information or the like supplied from the control unit 132 to generate a signal in a predetermined format, then subjects the generated signal to modulation processing, and subsequently supplies the modulated signal to the analog-signal conversion unit 146.

The analog-signal conversion unit 146 subjects the signals supplied from the signal generation unit 145 to Digital Analog (DA) conversion to convert the signals from digital signals to analog signals, and then supplies the analog signals to the RF transmission unit 147.

The RF transmission unit 147 includes, for example, a frequency converter, an amplifier, and a filter. The RF transmission unit 147 subjects the signals supplied from the analog-signal conversion unit 146 to frequency conversion processing, amplification processing, filter processing, and the like, and then supplies the signals to the antenna 121 through the antenna sharing unit 141 so as to cause the signals to be transmitted.

The control unit 132 is provided with a communication control unit 151, an MAPN processing unit 152, and a display control unit 153.

The communication control unit 151 controls communication processing (for example, transmission, reception, and the like of a signal) of the wireless communication module 122. In addition, for example, the communication control unit 151 supplies a signal supplied from the communication unit 131 to the data processing unit 112, and supplies information supplied from the data processing unit 112 to the communication unit 131. Moreover, for example, the communication control unit 151 controls (the RF transmission unit 147 of) the communication unit 131, and thereby controls the intensity of a signal transmitted from the antenna 121.

The MAPN processing unit 152 performs various processing related to MAPN. For example, the MAPN processing unit 152 performs, for example, processing required when the wireless communication device 101 enters an MAPN, and management or the like of information related to an MAPN to which the wireless communication device 101 belongs. In addition, the MAPN processing unit 152 performs the control or the like of cooperative processing with other wireless communication devices 101 (access points) belonging to the MAPN.

The display control unit 153 controls displaying of various kinds of information displayed by the display unit 114.

Configuration Example of Wireless Communication Device 201

Figure 2:
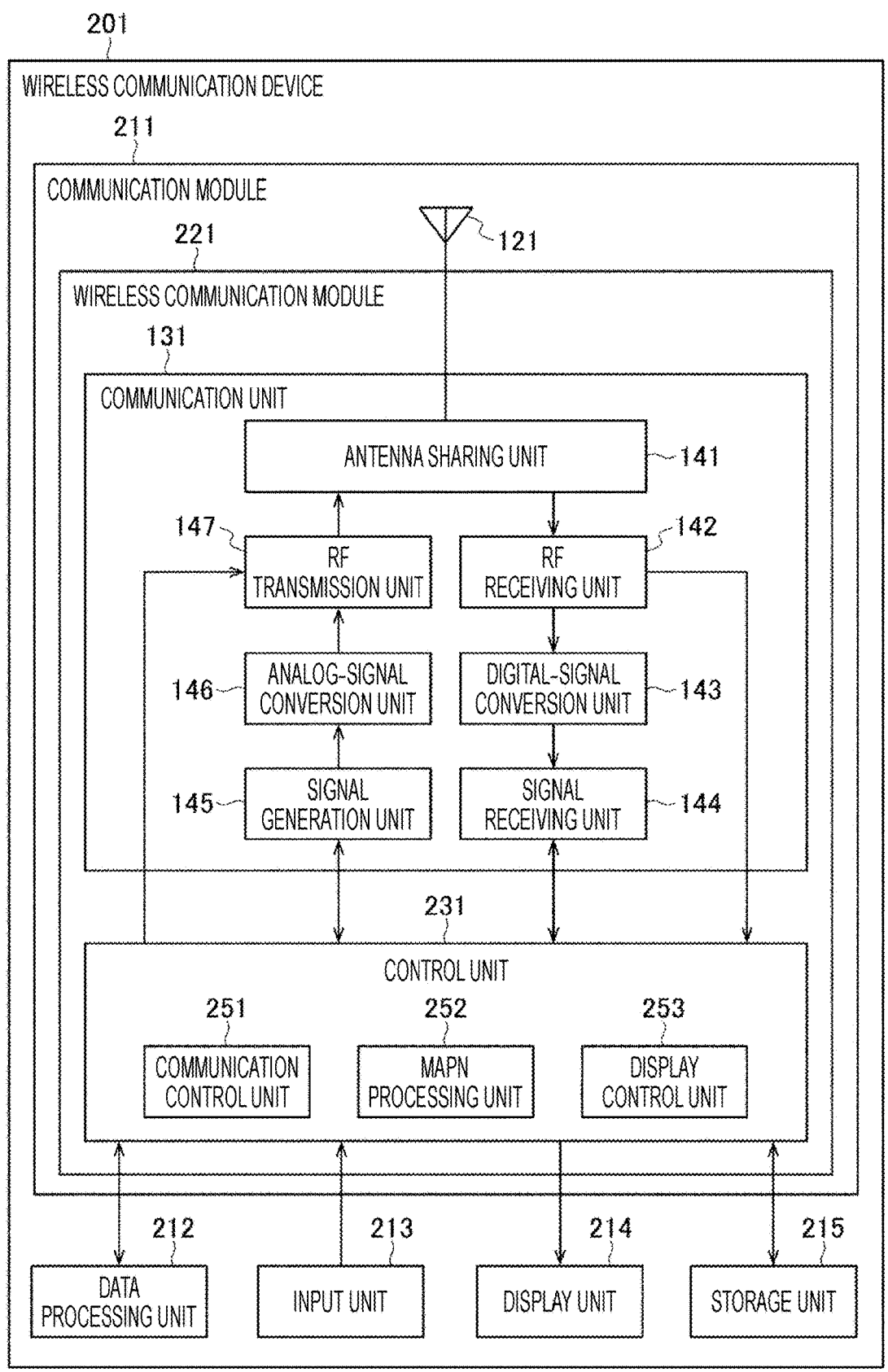
FIG. 2 is a block diagram illustrating a configuration example of a wireless communication device (station) to which the present technology is applied.

FIG. 2 is a block diagram illustrating a configuration example of the wireless communication device 201 to which the present technology is applied. It should be noted that in the figure, the same reference numerals are used to denote parts corresponding to those of the wireless communication device 101 shown in FIG. 1, and the description thereof will be omitted as appropriate.

The wireless communication device 201 functions as a station (wireless terminal station), and wirelessly communicates with an access point.

The wireless communication device 201 is provided with a communication module 211, a data processing unit 212, an input unit 213, a display unit 214, and a storage unit 215.

The communication module 211 wirelessly communicates with an access point.

The data processing unit 212 extracts various information from a signal supplied from the communication module 211, and supplies the extracted information, generated information, or the like to the communication module 211.

The input unit 213 is provided with a device that is used by a user to input various data, instructions, and the like. For example, the input unit 213 is provided with an operation device such as a touch panel, a button, a microphone, a switch, and a lever, an operation device that enables inputting by a method other than manual operations, for example, by a voice or a gesture, and the like.

The display unit 214 is provided with a device that is used to display various information. For example, the display unit 214 is provided with a display or the like.

The storage unit 215 stores data or the like required for processing of the communication module 211.

In comparison with the communication module 111 shown in FIG. 1, the communication module 211 is provided with a wireless communication module 221 as an alternative to the wireless communication module 122, which is a point of difference therebetween.

The wireless communication module 221 includes, for example, a semiconductor chip. While giving/receiving information to/from the data processing unit 212, the wireless communication module 221 supplies various kinds of signals to the antenna 121 to cause the antenna 121 to transmit the signals, and performs processing corresponding to a signal received by the antenna 21, as appropriate.

In comparison with the wireless communication module 122 shown in FIG. 1, the wireless communication module 221 is provided with a control unit 231 as an alternative to the control unit 132, which is a point of difference therebetween.

The control unit 231 controls, for example, the operation of the whole wireless communication module 221.

The control unit 231 is provided with a communication control unit 251, an MAPN processing unit 252, and a display control unit 253.

The communication control unit 251 controls communication processing (for example, transmission, reception, and the like of a signal) of the wireless communication module 221. In addition, for example, the communication control unit 251 supplies a signal supplied from the communication unit 131 to the data processing unit 212, and supplies information supplied from the data processing unit 212 to the communication unit 131. Moreover, for example, the communication control unit 251 controls (the RF transmission unit 147 of) the communication unit 131, and thereby controls the intensity of a signal transmitted from the antenna 121.

The MAPN processing unit 252 performs various processing related to MAPN. For example, the MAPN processing unit 252 performs, for example, processing for constructing an MAPN, and management of information related to the MAPN.

The display control unit 253 controls displaying of various kinds of information displayed by the display unit 214.

MAPN Construction Processing

Next, MAPN construction processing will be described with reference to FIGS. 3 to 12.

Configuration Example of Wireless Communication System

Figure 3:
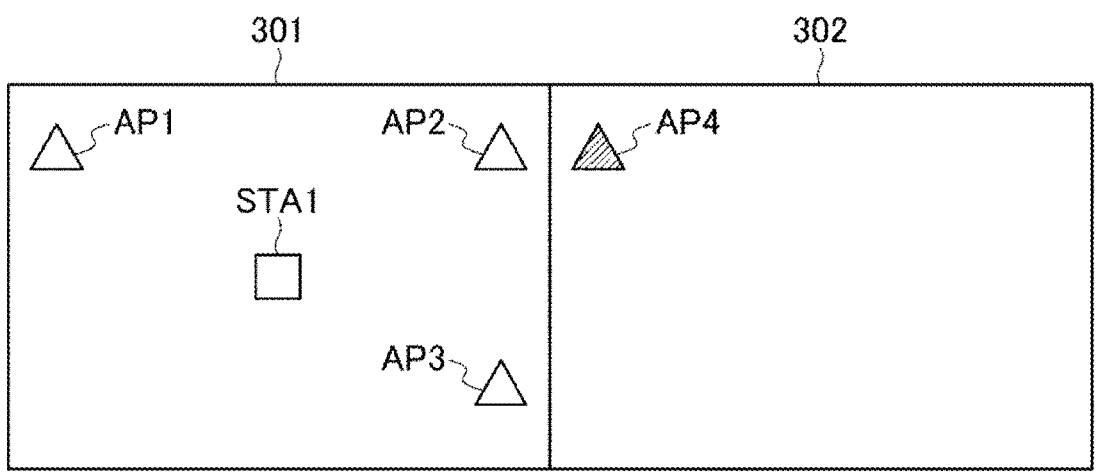
FIG. 3 is a diagram illustrating a configuration example of a wireless communication system.

FIG. 3 shows a configuration example of a wireless communication system, the configuration example being used to explain MAPN construction processing.

This wireless communication system is provided with access points AP1 to AP4, and a station STA1. The access points AP1 to AP4 are each configured by the wireless communication device 101 shown in FIG. 1. The station STA1 is configured by the wireless communication device 201 shown in FIG. 2.

The access points AP1 to AP3 are installed inside a house 301. The access point AP4 is installed in a house 302 next to the house 301. The station STA1 exists in the house 301.

A case where an MAPN is constructed by the access points AP1 to AP3 installed in the same house 301 will be described below.

It should be noted that in a case where it is not necessary to individually distinguish the access points AP1 to AP4, hereinafter, the access points AP1 to AP4 are merely referred to as "access point AP".

Processing of Station STA1

First of all, processing of the station STA1 will be described with reference to a flowchart of FIG. 4 and a sequence diagram of FIG. 5.

In step S1, the station STA1 receives a beacon frame. For example, the station STA1 monitors (observes) the beacon frame for a predetermined time period. This monitoring time period is set at, for example, a time that is longer than or equal to a maximum value of intervals at which a beacon signal is periodically transmitted from each access point AP. In addition, the station STA1 performs reception processing of receiving a beacon frame in a plurality of predetermined frequency channel bands.

Figure 12:
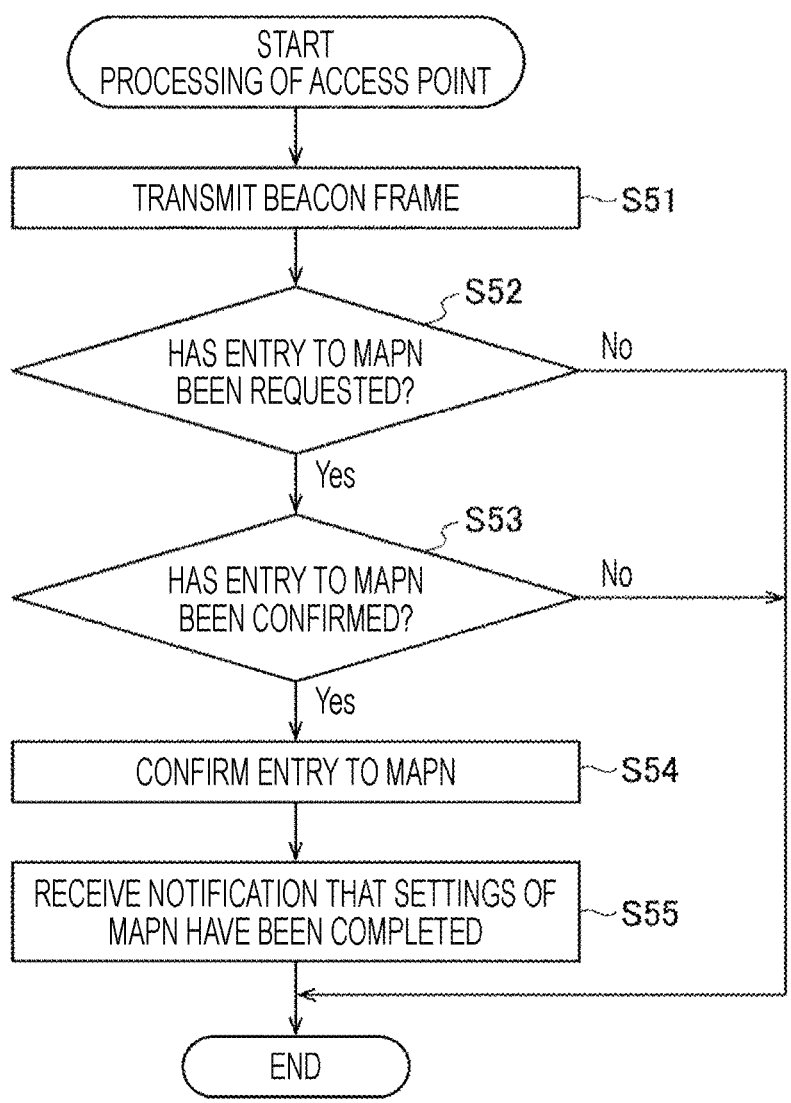
FIG. 12 is a flowchart illustrating processing of an access point.

Subsequently, in step S51 of FIG. 12 described below, the RF receiving unit 142 receives, through the antenna 121 and the antenna sharing unit 141, a beacon frame transmitted from each access point AP, and supplies the beacon frame to the control unit 231 through the digital-signal conversion unit 143 and the signal receiving unit 144.

Figure 6:
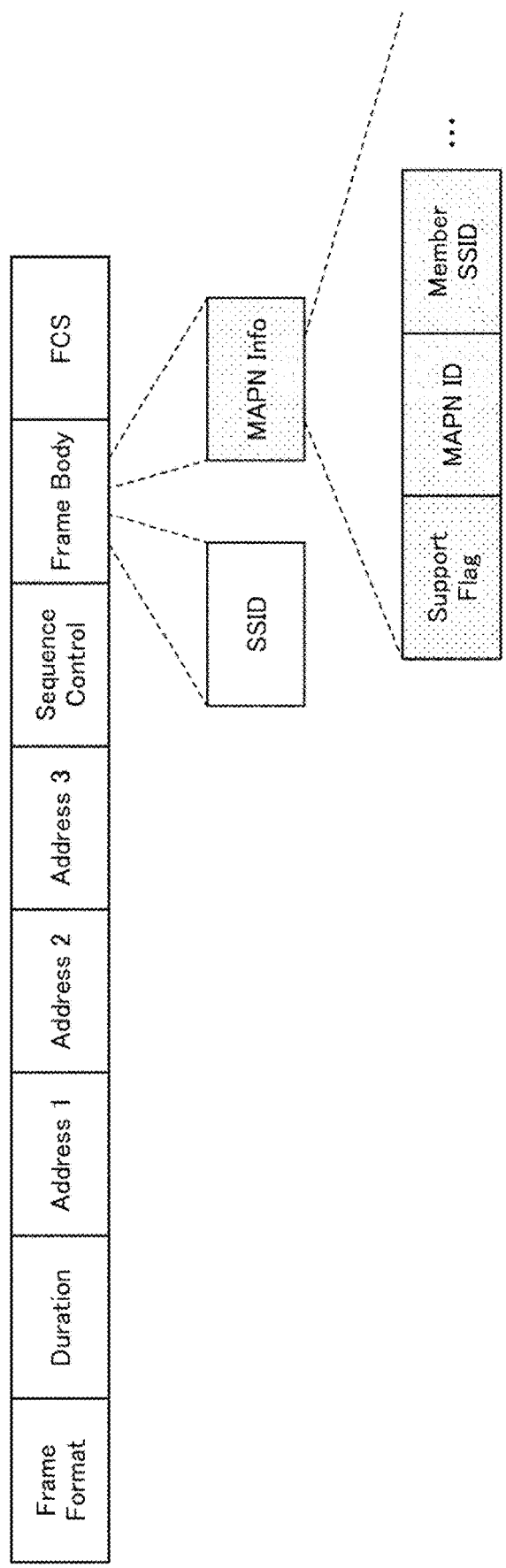
FIG. 6 is a diagram illustrating an example of a format of a beacon frame.

FIG. 6 shows an example of a format of a beacon frame.

A beacon frame includes fields of "Frame Format", "Duration", "Address 1" to "Address 3", "Sequence Control", "Frame body", and "Frame Check Sequence (FCS)".

The "Frame Format" is a field that stores information indicating a kind of a frame. In the case of a beacon frame, information indicating that a kind of a frame is a beacon frame is stored in the "Frame Format".

The "Duration" is a field that stores information indicating, for example, a length of a transmission period of a frame.

The "Address 1" is a field that stores, for example, an address (for example, a MAC address) of another access point or station that receives a frame. Since the beacon frame is broadcasted without identification of a receiver, a broadcast address is stored in the "Address 1".

The "Address 2" is a field that stores, for example, an address (for example, a MAC address) of an access point or a station that becomes a transmitter of a frame. Here, an address of an access point AP that is a transmitter of a beacon frame is stored in the "Address 2".

The "Address 3" is a field that stores, for example, an address (for example, an MAPN ID) of an MAPN to which the access point AP belongs.

The "Sequence Control" is a field that stores a sequence number or the like of information to be transmitted.

The "Frame body" is a field that stores various information transmitted by the frame. The "Frame body" of the beacon frame includes, for example, "Service Set Identifier (SSID)", and "MAPN information (MAPN Info)".

The "SSID" is a field that stores an SSID for identifying an access point AP that is a transmitter.

The "MAPN Info" is a field that stores information related to an MAPN to which the access point AP belongs. The "MAPN Info" includes, for example, "Support Flag", "MAPN ID", and "Member SSID".

The "Support Flag" is a field that stores a flag indicating whether or not the access point AP supports an MAPN, in other words, indicating whether or not the access point AP can enter an MAPN.

The "MAPN ID" is a field that stores identification information (MAPN ID) for identifying an MAPN to which the access point AP belongs.

The "Member SSID" is a field that stores information indicating a configuration of the MAPN to which the access point AP belongs. More specifically, the "Member SSID" is a field that stores identification information (SSID) for identifying the other access points AP belonging to the MAPN to which the access point AP belongs. The number of "Member SSID" fields to be provided is equal to the number of the other access points AP each belonging to the MAPN. It should be noted that in a case where no other access point AP belongs to the MAPN, for example, "Member SSID" is omitted.

It should be noted that in a case where the access point AP does not support the MAPN, or in a case where the access point AP does not belong to the MAPN, for example, "MAPN ID" and "Member SSID" are omitted.

The "FCS" is a field that stores a frame check sequence.

In step S2, the MAPN processing unit 252 detects a state of the MAPN. Specifically, on the basis of MAPN information of a beacon frame from each access point AP, the MAPN processing unit 252 detects whether or not each access point AP enters the MAPN, and an MAPN to which each access point AP belongs.

In step S3, the display unit 214 displays an MAPN setting screen under the control of the control unit 253. Subsequently, the MAPN processing unit 252 waits until a user selects an access point AP to be added to the MAPN.

Figure 7:
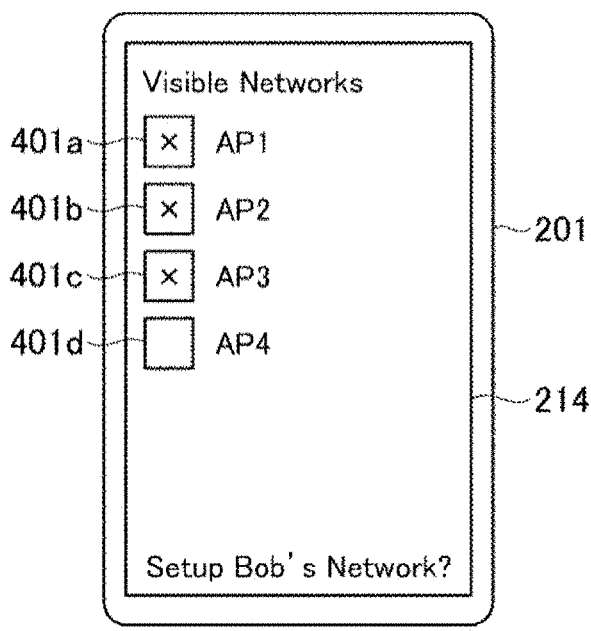
FIG. 7 is a diagram illustrating a first example of a setting screen.
Figure 8:
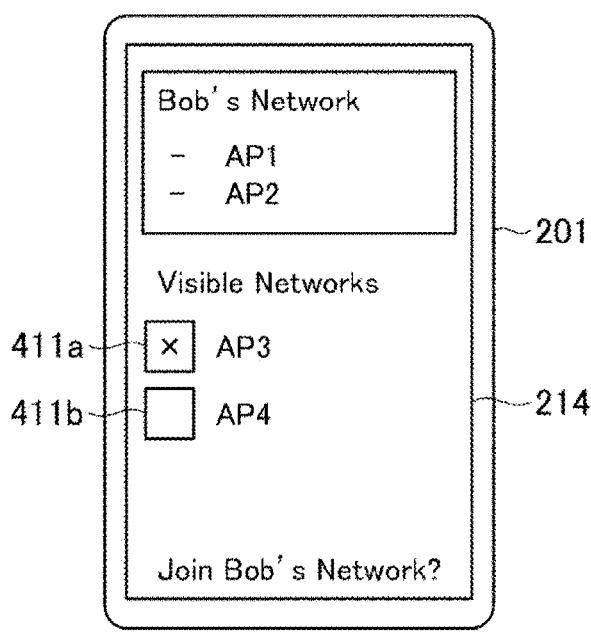
FIG. 8 is a diagram illustrating a second example of a setting screen.

FIGS. 7 and 8 each show an example of an MAPN setting screen.

FIGS. 7 and 8 each show an example of an MAPN setting screen that, in a case where the station STA1 (the wireless communication device 201) is configured by a smart phone, is displayed on the display unit 214 that includes a display. FIG. 7 shows an example of a setting screen displayed in a case where no access point AP belongs to the MAPN; and FIG. 8 shows an example of a setting screen displayed in a case where a part of access points already belongs to the MAPN.

The setting screen in FIG. 7 lists access points AP that have been detected as a result of receiving a beacon frame by the station STA1. In addition, check boxes 401a to 401d are displayed on the left side of the respective access points AP. For example, through the input unit 213, the user checks the check box of the access point AP to be added to the MAPN. Consequently, the access point AP to be added to the MAPN is selected. In this example, the access points AP1 to AP3 are being selected.

The setting screen displays, at the lower end thereof, an MAPN ID, and a message asking whether or not to set up the MAPN. In this example, "Bob's Network" is set as the MAPN ID.

In the upper part of the setting screen in FIG. 8, information indicating a current MAPN configuration is displayed. Specifically, among the detected access points AP, access points AP each belonging to an MAPN, the MAPN ID of which is Bob's Network, are listed.

In the center of the setting screen, access points AP that do not belong to the MAPN, among the detected access point AP, are listed. In addition, check boxes 411a and 411b are displayed on the left side of the respective access points AP. For example, through the input unit 213, the user checks the check box of the access point AP to be added to the MAPN. Consequently, the access point AP to be added to the MAPN is selected. In this example, the access point AP3 is being selected.

The setting screen displays, at the lower end thereof, a message asking whether or not the selected access point AP is add to the MAPN, the MAPN ID of which is Bob's Network.

It should be noted that an access point AP in which a support flag of the beacon frame is not set at a value indicating that the MAPN is supported, and an access point AP in which the beacon frame does not include MAPN information, cannot enter the MAPN. Therefore, those access points AP are not displayed on the setting screen.

In step S4, the MAPN processing unit 252 determines whether or not an entry of an access point to the MAPN has been requested. For example, in a case where an access point AP to be added to the MAPN is selected, and operation of confirming the selection is then performed for the input unit 113, the MAPN processing unit 252 determines that an entry of an access point to the MAPN has been requested, and the processing proceeds to step S5.

It should be noted that also in a case where an MAPN is newly constructed, and one or more access points AP are then registered in the new MAPN, it is determined that an entry of an access point to the MAPN has been requested.

In step S5, the station STA1 requests the access point AP to enter the MAPN.

Specifically, the communication control unit 151 supplies the signal generation unit 145 with information to be stored in each field of an MAPN setup request frame, and gives an instruction on generation of the MAPN setup request frame. The MAPN setup request frame is a signal for requesting the access point AP selected by the user to enter the MAPN.

On the basis of the information supplied from the communication control unit 151, the signal generation unit 145 generates the MAPN setup request frame, and supplies the MAPN setup request frame to the RF transmission unit 147 through the analog-signal conversion unit 146.

The RF transmission unit 147 transmits the MAPN setup request frame through the antenna sharing unit 141 and the antenna 121.

Figure 9:
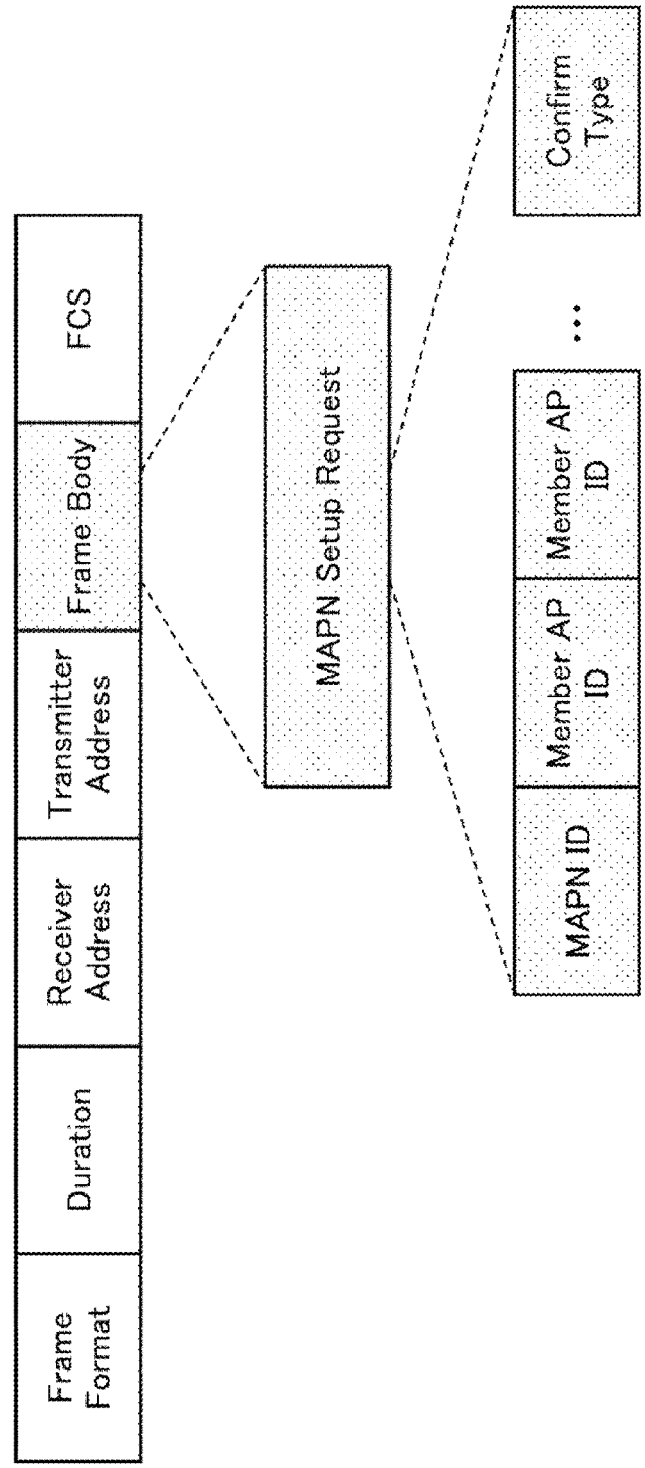
FIG. 9 is a diagram illustrating an example of a format of an MAPN setup request frame.

FIG. 9 shows an example of a format of an MAPN setup request frame.

The MAPN setup request frame includes fields of "Frame Format", "Duration", "Receiver Address", "Transmitter Address", "Frame body", and "Frame Check Sequence (FCS)". It should be noted that explanation of fields that overlap those of the beacon frame shown in FIG. 6 will be omitted as appropriate.

The "Frame Format" stores information indicating that a kind of the frame is an MAPN setup request frame.

The "Receiver Address" is, for example, a field that stores an address (for example, a MAC address, an SSID) of an access point AP that receives the frame, and an address of an access point AP that is requested to enter the MAPN is stored in the field.

The "Transmitter Address" is, for example, a field that stores an address (for example, a MAC address) of the station STA1 that becomes a transmitter of the frame.

The "Frame body" of the MAPN setup request frame includes "MAPN Setup Request".

The "MAPN Setup Request" is a field that stores information related to a target MAPN to which an access point AP is requested to make an entry. The "MAPN Setup Request" includes, for example, "MAPN ID", "Member AP ID", and "Confirm Type".

The "MAPN ID" is a field that stores an MAPN ID of a target MAPN to which an access point AP makes an entry.

The "Member AP ID" is a field that stores information indicating a configuration of the MAPN. Specifically, the "Member AP ID" is a field that stores an SSID of an access point AP that already belongs to the MAPN. The number of "Member AP ID" fields to be provided is equal to the number of access points AP each belonging to the MAPN. It should be noted that in a case where no access point AP belongs to the MAPN, for example, "Member AP ID" is omitted.

The "Confirm Type" stores information indicating a method for confirming an entry of an access point AP to the MAPN. An arbitrary method can be employed as the confirming method. Incidentally, as a confirming method, a case of employing a method in which a "Confirm" button is pressed at an access point AP will be described below.

In step S6, the MAPN processing unit 252 determines whether or not an access point AP that needs to enter the MAPN exists.

For example, in a case where an access point AP that has requested an entry to an MAPN exists in an available area of the MAPN, the user performs confirmation processing according to a method set by the MAPN setup request frame. Subsequently, in step S54 of FIG. 12 described below, the access point AP in which the confirmation processing has been performed by the user transmits, to the station STA1, a setup confirm frame in a predetermined format.

In a case where the setup confirm frame transmitted from the access point AP has been received through the antenna 121 and the antenna sharing unit 141, the RF receiving unit 142 supplies the setup confirm frame to the control unit 231 through the digital-signal conversion unit 143 and the signal receiving unit 144. In addition, in a case where a setup confirm frame has been received from at least one of access points AP that each have requested an entry to the MAPN, the MAPN processing unit 252 determines that an access point AP that needs to enter the MAPN exists, and consequently the processing proceeds to step S7.

In step S7, the station STA1 provides notification that settings of the MAPN have been completed.

Specifically, the communication control unit 251 supplies the signal generation unit 145 with information to be stored in each field of an MAPN setup complete frame, and gives an instruction on generation of the MAPN setup complete frame. The MAPN setup complete frame is a signal for providing notification that settings of the MAPN have been completed.

On the basis of the information supplied from the communication control unit 251, the signal generation unit 145 generates the MAPN setup complete frame, and supplies the MAPN setup complete frame to the RF transmission unit 147 through the analog-signal conversion unit 146.

The RF transmission unit 147 transmits the MAPN setup complete frame through the antenna sharing unit 141 and the antenna 121.

Figure 10:
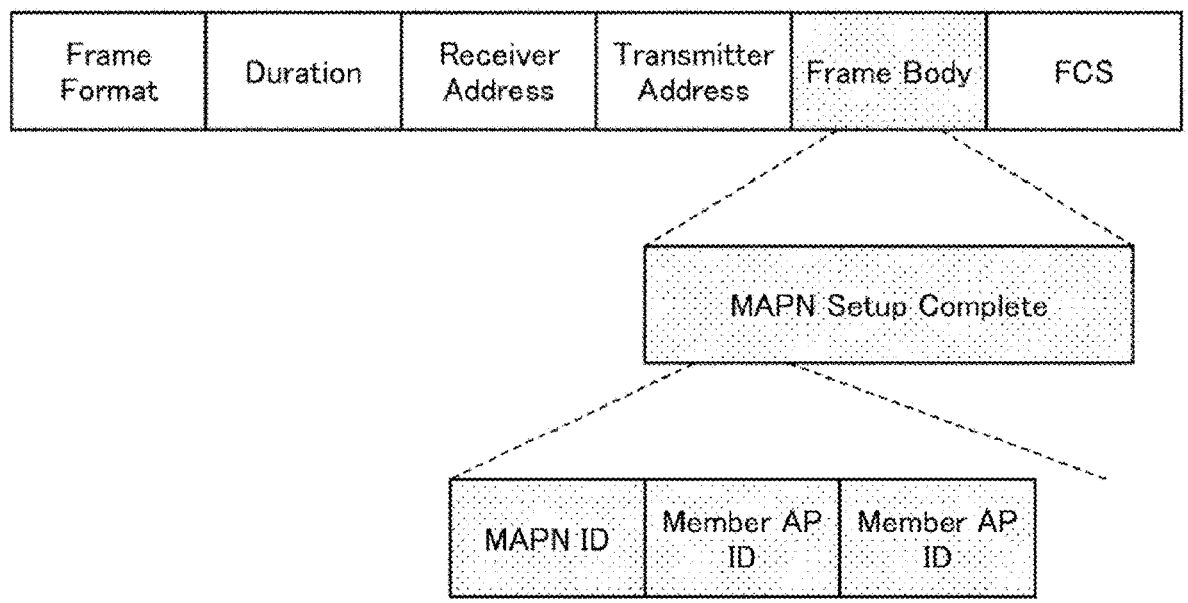
FIG. 10 is a diagram illustrating an example of a format of an MAPN setup complete frame.

FIG. 10 shows an example of a format of an MAPN setup complete frame.

The MAPN setup complete frame includes fields of "Frame Format", "Duration", "Receiver Address", "Transmitter Address", "Frame body", and "Frame Check Sequence (FCS)". It should be noted that explanation of fields that overlap those of the beacon frame shown in FIG. 6, and those of the MAPN setup request frame shown in FIG. 9, will be omitted as appropriate.

The "Frame Format" sets information indicating that a kind of the frame is an MAPN setup complete frame.

The "Receiver Address" is a field that stores, for example, an address (for example, a MAC address, an SSID) of an access point AP that receives the frame. More specifically, the "Receiver Address" stores an address of an access point AP that is notified of completion of settings of the MAPN.

The "Transmitter Address" is, for example, a field that stores an address (for example, a MAC address) of the station STA1 that becomes a transmitter of the frame.

The "Frame body" of the MAPN setup complete frame includes "MAPN Setup Complete".

The "MAPN Setup Complete" is a field that stores information related to an MAPN, the settings of which have been completed. The "MAPN Setup Request" includes, for example, "MAPN ID", and "Member AP ID".

The "MAPN ID" is a field that stores an MAPN ID of the MAPN, the settings of which have been completed.

The "Member AP ID" is a field that stores information indicating a configuration of the MAPN. Specifically, the "Member AP ID" is a field that stores an SSID of an access point AP that belongs to the MAPN. The number of "Member AP ID" fields to be provided is equal to the number of access points AP each belonging to the MAPN, the access points including an access point AP that has been newly added to the MAPN.

Here, for example, the MAPN setup complete frame is transmitted to all access points AP each belonging to the MAPN.

However, by using the MAPN setup request frame, information related to the MAPN has already been transmitted to the access point AP that has been newly added to the MAPN, and therefore it is not always necessary to transmit the MAPN setup complete frame. In other words, the MAPN setup complete frame may be adapted to be transmitted to access points AP excluding an access point to which the MAPN setup request frame has been transmitted, among the access points AP each belonging to the MAPN.

In step S8, the display unit 214 displays an MAPN setting completion screen under the control of the display control unit 253.

Figure 11:
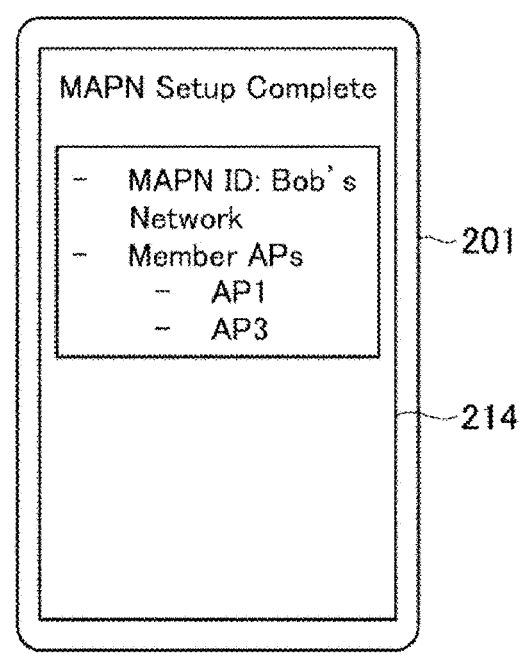
FIG. 11 is a diagram illustrating an example of a setting completion screen.

FIG. 11 shows an example of an MAPN setting completion screen.

The setting completion screen displays, in the upper part thereof, a message indicating that settings of the MAPN have been completed.

In an area slightly above the center of the setting completion screen, information related to a configuration of an MAPN, the settings of which have been completed, is displayed. Specifically, an MAPN ID is displayed, and access points AP each belonging to the MAPN are listed.

Meanwhile, in step S6, in a case where no setup confirm frame has been received from any of the access points AP that each have requested an entry to the MAPN, the MAPN processing unit 252 determines that an access point AP that needs to enter the MAPN does not exist, and consequently processings in steps S7 and S8 are skipped, and the processing of the station STA1 ends.

In addition, in step S4, for example, in a case where although an access point AP that is requested to enter the MAPN is selected, operation of confirming the selection has not been performed for the input unit 113, the MAPN processing unit 252 determines that an entry of the access point to the MAPN has not been requested, and consequently processings in steps S5 to S8 are skipped, and the processing of the station STA1 ends.

Processing of Access Point AP

Next, processing that is executed by each access point AP corresponding to the processing of the station STA1 shown in FIG. 4 will be described with reference to a flowchart of FIG. 12 and the sequence diagram of FIG. 5.

In step S51, an access point AP transmits a beacon frame.

Specifically, the communication control unit 151 supplies the signal generation unit 145 with information to be stored in each field of a beacon frame, and instructs generation of the beacon frame.

On the basis of the information supplied from the communication control unit 151, the signal generation unit 145 generates the beacon frame, and supplies the beacon frame to the RF transmission unit 147 through the analog-signal conversion unit 146.

The RF transmission unit 147 transmits the beacon frame through the antenna sharing unit 141 and the antenna 121.

In step S52, the MAPN processing unit 152 determines whether or not an entry to the MAPN has been requested.

Figure 4:
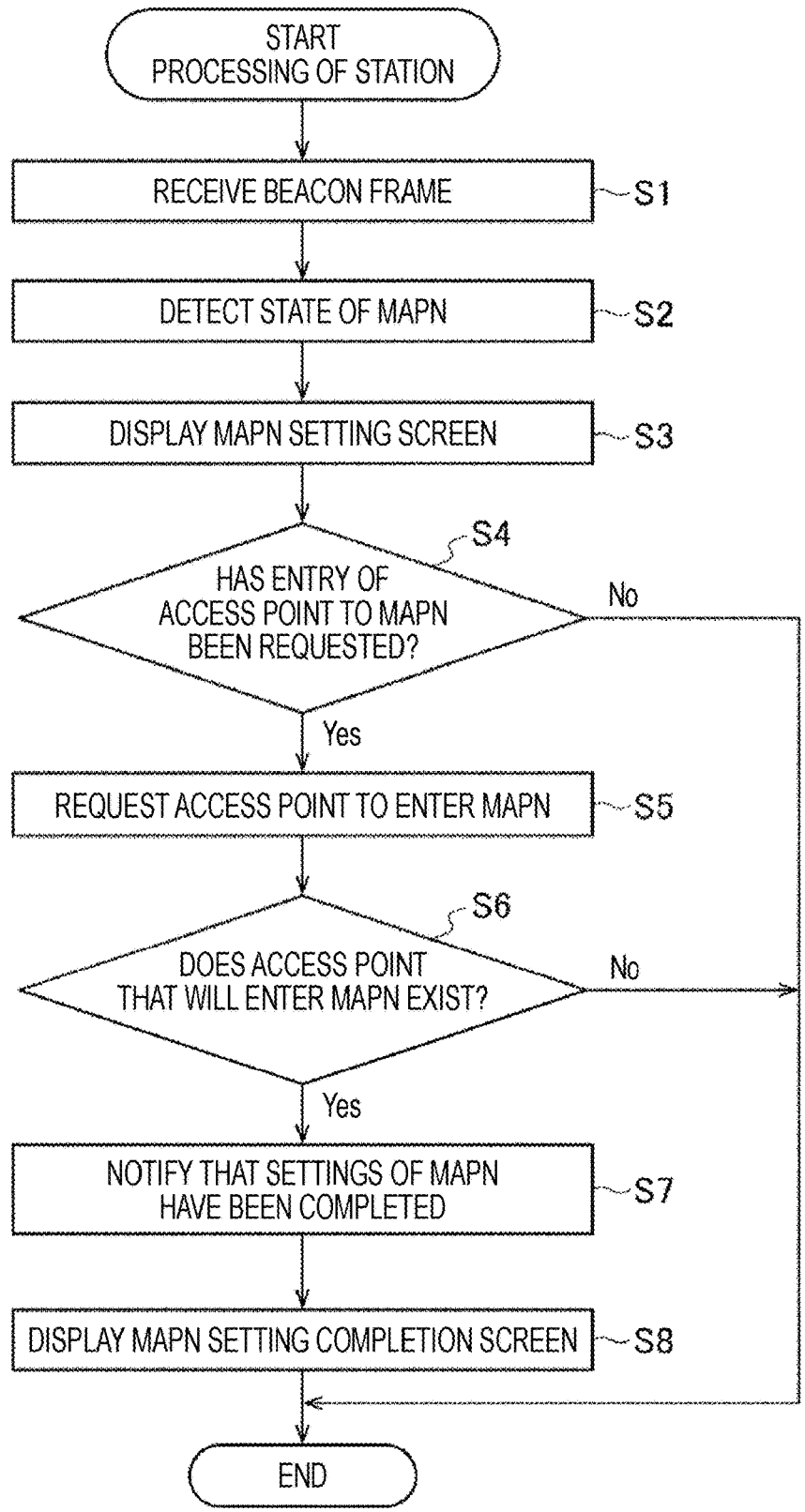
FIG. 4 is a flowchart illustrating processing of a station.

For example, in a case where the MAPN setup request frame transmitted from the station STA1 has been received through the antenna 121 and the antenna sharing unit 141 in step S5 of FIG. 4 described above, the RF receiving unit 142 supplies the MAPN setup request frame to the control unit 132 through the digital-signal conversion unit 143 and the signal receiving unit 144. In addition, in a case where "Receiver Address" of the MAPN setup request frame is set at an own address, the MAPN processing unit 152 determines that an entry to the MAPN has been requested, and consequently the processing proceeds to step S53.

In step S53, the access point AP determines whether or not the entry to the MAPN has been confirmed.

For example, in a case where the "Confirm Type" of the MAPN setup request frame is set at button pressing, the display unit 114 displays, under the control of the display control unit 153, a confirmation screen that prompts confirmation of the entry of the access point AP to the MAPN. The confirmation screen displays, for example, a confirm button.

Meanwhile, for example, in a case where the access point AP exists in an available area of the MAPN, and an entry of the access point AP to the MAPN is permitted, the user presses a "Confirm" button in the confirmation screen through the input unit 113.

Subsequently, in a case where the "Confirm" button is pressed within a predetermined time period, the MAPN processing unit 152 determines that the entry to the MAPN has been confirmed, and consequently the processing proceeds to step S54.

In step S54, the access point AP confirms the entry to the MAPN.

Specifically, the communication control unit 151 supplies the signal generation unit 145 with information to be stored in each field of a setup confirm frame, and gives an instruction on generation of the setup confirm frame. The setup confirm frame is a signal for confirming the entry of the access point AP to the MAPN.

On the basis of the information supplied from the communication control unit 151, the signal generation unit 145 generates the setup confirm frame, and supplies the setup confirm frame to the RF transmission unit 147 through the analog-signal conversion unit 146.

The RF transmission unit 147 transmits the setup confirm frame to the station STA1 through the antenna sharing unit 141 and the antenna 121.

In step S55, the access point AP receives notification that settings of the MAPN have been completed.

For example, in a case where the MAPN setup complete frame transmitted from the station STA1 has been received through the antenna 121 and the antenna sharing unit 141 in step S7 of FIG. 4 described above, the RF receiving unit 142 supplies the MAPN setup complete frame to the control unit 132 through the digital-signal conversion unit 143 and the signal receiving unit 144.

The MAPN processing unit 152 causes the storage unit 115 to store, for example, information that is stored in the "MAPN Setup Complete" field of the MAPN setup complete frame.

After that, the processing of the access point AP ends.

Meanwhile, in step S53, in a case where the "Confirm" button has not been pressed within the predetermined time period, the MAPN processing unit 152 determines that the entry to the MAPN has not been confirmed, and consequently processings in steps S54 and S55 are skipped, and the processing of the access point AP ends. In other words, the access point AP is not added to the MAPN.

Figure 5:
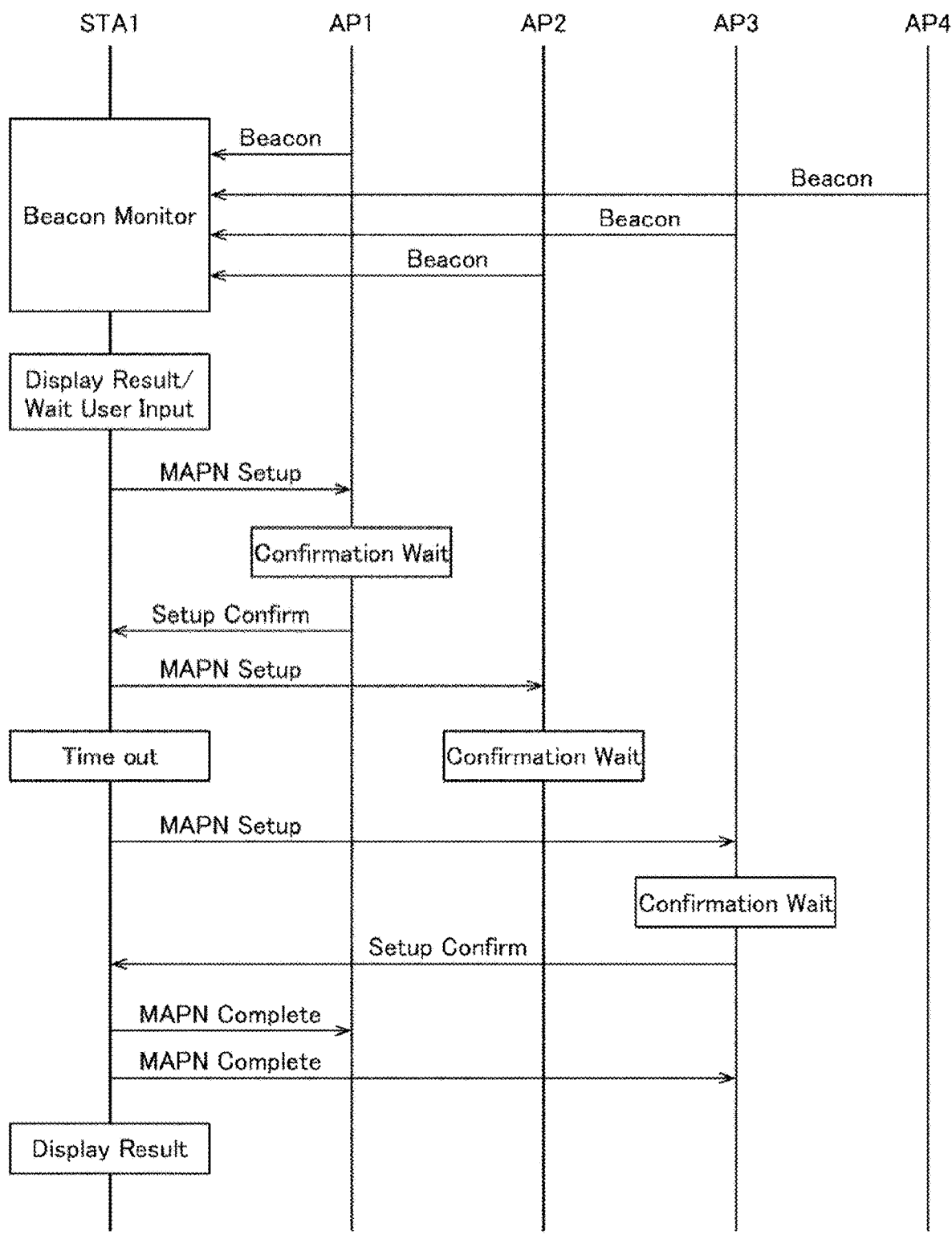
FIG. 5 is a sequence diagram illustrating an example of a protocol between a station and each access point.

For example, in the example shown in FIG. 5, after the MAPN setup request frame is transmitted to the access point AP2, confirmation processing has not been performed within a predetermined time period, and consequently a time-out has occurred. Therefore, the access point AP2 is not added to the MAPN.

In addition, in step S52, the MAPN processing unit 152 determines, in a case where an MAPN setup request frame addressed to itself has not been received, that an entry to the MAPN has not been requested, and processings in steps S53 to S55 are skipped, and the processing of the access point AP ends.

Easy construction of an MAPN is enabled in the manner described above. In other words, merely by selecting, on the basis of a beacon frame from each access point AP, a desired access point from among assess points listed on the setting screen displayed in the station STA1, and by performing confirmation processing in the selected access point AP, a user is enabled to construct an MAPN that includes the desired access point AP.

In addition, the setting screens shown in FIGS. 7 and 8, and the setting completion screen shown in FIG. 11, enable the user to easily grasp a configuration of the MAPN.

Moreover, receiving the MAPN setup request frame or the MAPN setup complete frame from the station STA1 enables access points AP to share information related to the MAPN between the access points.

2. Modified Example

A modified example of the above-described embodiment of the present technology will be described below.

The above explanation shows an example in which confirmation processing of confirming an entry to the MAPN is performed on the access point side. However, the confirmation processing can also be omitted. In other words, an access point selected by the station may be adapted to be added to the MAPN without being confirmed on the access point side.

In this case, for example, the MAPN setup request frame is a signal for providing notification of an entry to the MAPN, and therefore the "Confirm Type" field is omitted. In addition, for example, the MAPN setup complete frame may be adapted to be transmitted to access points excluding an access point to which the MAPN setup request frame has been transmitted (that is to say, an added access point), among access points each belonging to the MAPN.

Further, the above explanation shows an example in which the wireless communication module 122 (FIG. 1) and the wireless communication module 221 (FIG. 2) are each configured by a semiconductor chip. However, for example, the communication module 111 (FIG. 1) and the communication module 211 (FIG. 2) can also be each configured by one semiconductor chip.

Moreover, the present technology can be applied not only to communications that conform to the standards of IEEE 802.11 described above, but also general communications in which a network group of access points can be constructed. It should be noted that it does not matter whether or not this network group of access points requires cooperation among the access points.

3. Others

Configuration Example of Computer

The above-described series of processing can be executed by hardware, and can also be executed by software. In a case where the series of processing is executed by software, a program that configures the software is installed in a computer. Here, the computer includes a computer that is built into dedicated hardware, and a computer that is capable of executing various kinds of functions by installing various kinds of programs, for example, a general-purpose personal computer and the like.

Figure 13:
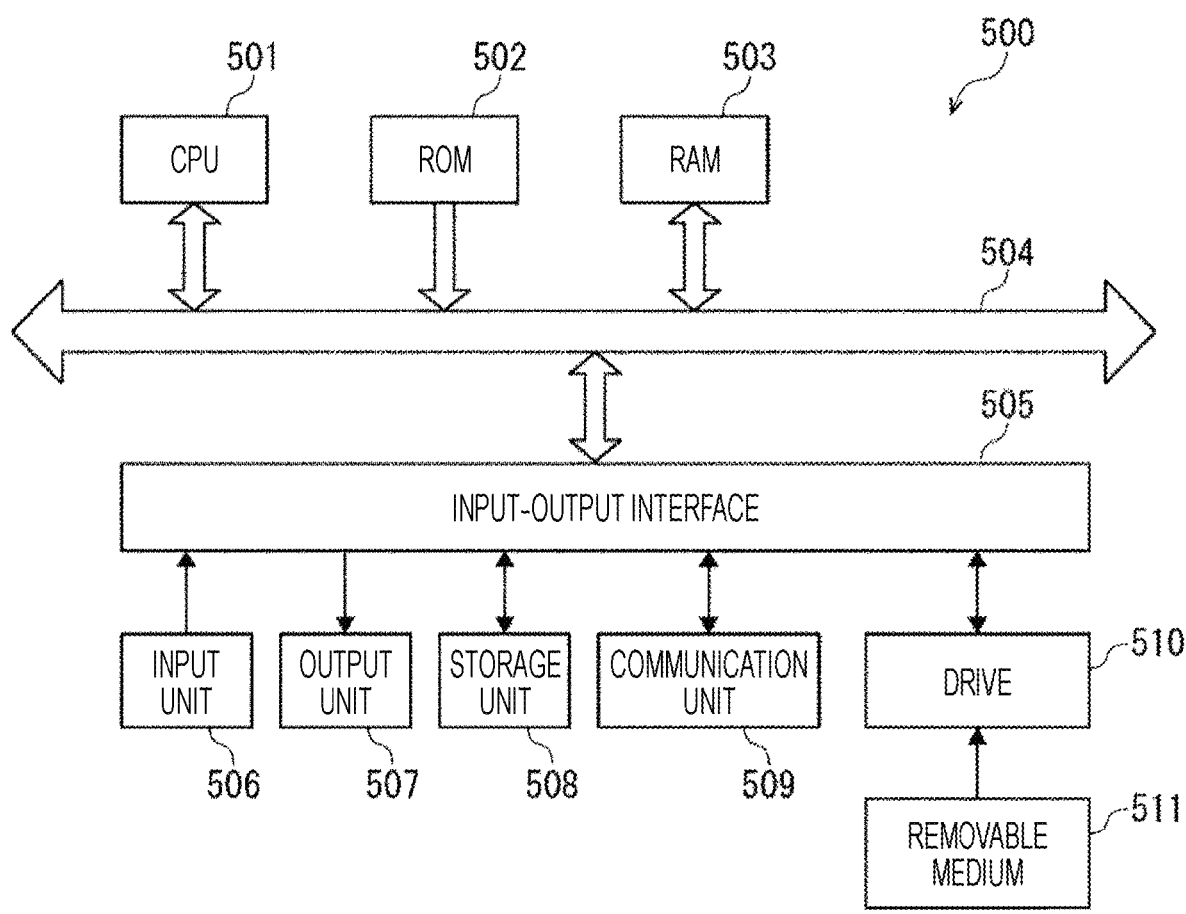
FIG. 13 is a diagram illustrating a configuration example of a computer.

FIG. 13 is a block diagram illustrating a configuration example of hardware of a computer that executes the above-described series of processing by a program.

In a computer 500, a Central Processing Unit (CPU) 501, a Read Only Memory (ROM) 502, and a Random Access Memory (RAM) 503 are mutually connected through a bus 504.

An input-output interface 505 is further connected to the bus 504. An input unit 506, an output unit 507, a storage unit 508, a communication unit 509, and a drive 510 are connected to the input-output interface 505.

The input unit 506 includes an input switch, a button, a microphone, an image capturing element, and the like. The output unit 507 includes a display, a speaker, and the like. The storage unit 508 includes a hard disk, a nonvolatile memory, and the like. The communication unit 509 includes a network interface and the like. The drive 510 drives a removable medium 511 such as a magnetic disk, an optical disk, a magneto-optical disk, or a semiconductor memory.

In the computer 500 that is configured as described above, the CPU 501 loads, for example, a program stored in the storage unit 508 into the RAM 503 through the input-output interface 505 and the bus 504, then executes the program, and consequently the above-described series of processing is performed.

The program executed by the computer 500 (CPU 501) can be provided by being recorded, for example, in a removable medium 511 such as a package medium. In addition, the program can be provided through a wired or wireless transmission medium such as a local area network, the Internet, and digital satellite broadcasting.

In the computer 500, the program can be installed in the storage unit 508 through the input-output interface 505 by mounting the removable medium 511 to the drive 510. In addition, the program can be received by the communication unit 509 through a wired or wireless transmission medium, and can be installed in the storage unit 508. Besides the above, the program can be installed in the ROM 502 or the storage unit 508 beforehand.

It should be noted that the program executed by the computer may be a program in which processing is time-sequentially performed along the order described in the present description, or may be a program in which processing is performed in parallel or in the required timing, for example, when a call is made.

In addition, in the present description, the system means a set of a plurality of components (devices, modules (parts), etc.), and it does not matter whether or not all components are disposed in the same housing. Therefore, a plurality of devices that is accommodated in a separate housing, and that is connected through a network, and one device having one housing that accommodates a plurality of modules, are both systems.

Moreover, embodiments of the present technology are not limited to the embodiments described above. Various modifications can be made within the scope that does not deviate from the gist of the present technology.

For example, the present technology can be configured as cloud computing in which one function is processed by being shared by a plurality of devices in cooperation through a network.

Further, each step explained in the above-described flowchart is executed by one device. Alternatively, the each step can be executed by being shared by a plurality of devices.

Furthermore, in a case where one step includes a plurality of pieces of processing, the plurality of pieces of processing included in the one step is executed by one device. Alternatively, the plurality of pieces of processing can be executed by being shared by a plurality of devices.

Example of Configuration Combination

The present technology can also employ the following configurations.

(1)

A wireless communication device including:

a signal generation unit that, on the basis of a first signal that includes access point identification information for identifying an access point that configures a network group, generates a second signal that includes the access point identification information, and includes network identification information for identifying an access-point network group to which the access point makes an entry; and a communication control unit that receives the first signal from the access point, and performs control of transmitting the second signal to the access point.

(2)

The wireless communication device set forth in the preceding (1), in which the second signal is a signal for requesting the access point to enter the network group.

(3)

The wireless communication device set forth in the preceding (2), in which the communication control unit further performs control of receiving a third signal for confirming an entry to the network group, the third signal being transmitted from the access point in response to the second signal.

(4)

The wireless communication device set forth in the preceding (3), in which in a case where the access point has entered the network group, the signal generation unit generates a fourth signal that includes the network identification information, and includes information indicating a configuration of the network group, and the communication control unit performs control of transmitting the fourth signal to an access point belonging to the network group.

(5)

The wireless communication device set forth in the preceding (4), in which the second signal further includes information indicating a configuration of the network group, and the communication control unit performs control of transmitting the fourth signal to access points excluding an access point to which the second signal has been transmitted, among access points each belonging to the network group.

(6)

The wireless communication device set forth in any of the preceding (3) to (5), further including a display control unit that, in a case where the access point has entered the network group, performs control of displaying information that includes a configuration of the network group.

(7)

The wireless communication device set forth in any of the preceding (2) to (6), in which the second signal further includes information indicating a method for confirming an entry of the access point to the network group.

(8)

The wireless communication device set forth in the preceding (1), in which the second signal is a signal for notifying the access point of an entry to the network group.

(9)

The wireless communication device set forth in the preceding (8), in which the signal generation unit generates a third signal that includes the network identification information, and includes information indicating a configuration of the network group, and the communication control unit performs control of transmitting the third signal to an access point belonging to the network group.

(10)
The wireless communication device set forth in the preceding (9), in which
the second signal further includes information indicating a configuration of the network group, and
the communication control unit performs control of transmitting the third signal to access points excluding an access point to which the second signal has been transmitted, among access points each belonging to the network group.

(11)
The wireless communication device set forth in any of the preceding (1) to (10), in which
the second signal further includes information indicating a configuration of the network group.

(12)
The wireless communication device set forth in any of the preceding (1) to (11), further including
a display control unit that, on the basis of the first signal, performs control of displaying a setting screen for selecting an access point to be added to the network group,
in which the communication control unit performs control of transmitting the second signal to the access point selected on the setting screen.

(13)
The wireless communication device set forth in the preceding (12), in which
the first signal includes information indicating a configuration of the network group, and
a configuration of the network group is displayed on the setting screen.

(14)
The wireless communication device set forth in any of the preceding (1) to (14), in which
the first signal is a beacon frame.

(15)
A wireless communication method performed by a wireless communication device, the wireless communication method including:
receiving a first signal that includes access point identification information for identifying an access point that configures a network group, the first signal being received from the access point;
generating a second signal that includes the access point identification information, and includes network identification information for identifying an access-point network group to which the access point makes an entry; and
transmitting the second signal to the access point.

(16)
A wireless communication device including:
a signal generation unit that generates a first signal that includes access point identification information for identifying the wireless communication device itself that is an access point configuring a network group, and includes information indicating whether or not the access point supports the network group; and
a communication control unit that performs control of transmitting the first signal to a station.

(17)
The wireless communication device set forth in the preceding (16), in which
the first signal further includes network identification information for identifying the network group to which the wireless communication device itself belongs.

(18)
The wireless communication device set forth in the preceding (17), in which
the first signal further includes information indicating a configuration of the network group to which the wireless communication device itself belongs.

(19)
The wireless communication device set forth in any of the preceding (16) to (18), in which
the communication control unit performs control of receiving a second signal that is transmitted from the station in response to the first signal, and that includes the access point identification information, and includes network identification information for identifying the network group to which the wireless communication device itself makes an entry.

(20)
The wireless communication device set forth in the preceding (19), in which
in the case of making an entry to the network group in response to the second signal, the signal generation unit generates a third signal for confirming the entry to the network group, and
the communication control unit performs control of transmitting the third signal to the station.

It should be noted that the effects described in the present description are to be construed as merely illustrative, and are not limitative, and that other effects may be produced.

REFERENCE SIGNS LIST

101 Wireless communication device
111 Communication module
112 Data processing unit
113 Input unit
114 Display unit
122 Wireless communication module
131 Communication unit
132 Control unit
142 RF receiving unit
145 Signal generation unit
147 RF transmission unit
151 Communication control unit
152 MAPN processing unit
153 Display control unit
201 Wireless communication device
211 Communication module
212 Data processing unit
213 Input unit
214 Display unit
221 Wireless communication module
251 Communication control unit
252 MAPN processing unit
253 Display control unit
AP1 to AP4 Access point
STA1 Station

The invention claimed is:
1. A wireless communication device comprising:
processing circuitry configured to:
on a basis of a first signal that includes access point identification information for identifying an access point that configures a network group according to a user's instruction, generate a second signal that includes the access point identification information, and includes network identification information for identifying an access-point network group to which the access point makes an entry;

receive the first signal from the access point, and perform control of transmitting the second signal to the access point, wherein the network group, after entry of the access point, includes two or more access points; and perform control of transmitting a network group setup complete notification to access points excluding the access point to which the second signal has been transmitted, among access points each belonging to the network group.

2. The wireless communication device according to claim 1, wherein
the second signal is a signal for requesting the access point to enter the network group.

3. The wireless communication device according to claim 2, wherein
the processing circuitry is further configured to perform control of receiving a third signal for confirming an entry to the network group, the third signal being transmitted from the access point in response to the second signal.

4. The wireless communication device according to claim 3, wherein
the network group setup complete notification includes the network identification information, and includes information indicating a configuration of the network group.

5. The wireless communication device according to claim 4, wherein
the second signal further includes information indicating a configuration of the network group.

6. The wireless communication device according to claim 3,
wherein the processing circuitry is further configured, in a case where the access point has entered the network group, to perform control of displaying information that includes a configuration of the network group.

7. The wireless communication device according to claim 2, wherein the second signal further includes information indicating a method for confirming an entry of the access point to the network group.

8. A wireless communication device comprising:
processing circuitry configured to:
on a basis of a first signal that includes access point identification information for identifying an access point that configures a network group according to a user's instruction, generate a second signal that includes the access point identification information, and includes network identification information for identifying an access-point network group to which the access point makes an entry;
receive the first signal from the access point, and perform control of transmitting the second signal to the access point, wherein the network group, after entry of the access point, includes two or more access points and wherein the second signal is a signal for notifying the access point of an entry to the network group;
generate a third signal that includes the network identification information, and includes information indicating a configuration of the network group;
perform control of transmitting the third signal to an access point belonging to the network group, wherein the second signal further includes information indicating a configuration of the network group; and
perform control of transmitting the third signal to access points excluding the access point to which the second signal has been transmitted, among access points each belonging to the network group.

9. The wireless communication device according to claim 1, wherein
the second signal further includes information indicating a configuration of the network group.

10. The wireless communication device according to claim 1, wherein
the processing circuitry is further configured, on a basis of the first signal, to perform control of displaying a setting screen for selecting an access point to be added to the network group, and to perform control of transmitting the second signal to the access point selected on the setting screen.

11. The wireless communication device according to claim 10, wherein
the first signal includes information indicating a configuration of the network group, and
a configuration of the network group is displayed on the setting screen.

12. The wireless communication device according to claim 1, wherein
the first signal is a beacon frame.

13. A wireless communication method performed by processing circuitry of a wireless communication device, the wireless communication method comprising:
receiving a first signal that includes access point identification information for identifying an access point that configures a network group according to a user's instruction, the first signal being received from the access point;
generating a second signal that includes the access point identification information, and includes network identification information for identifying an access-point network group to which the access point makes an entry;
transmitting the second signal to the access point, wherein the network group, after entry of the access point, includes two or more access points; and
transmitting a network group setup complete notification to access points excluding the access point to which the second signal has been transmitted, among access points each belonging to the network group.

14. A wireless communication device comprising:
processing circuitry configured to:
generate a first signal that includes access point identification information for identifying the wireless communication device itself that is an access point configuring a network group according to a user's instruction, and includes information indicating whether or not the access point supports the network group;
perform control of transmitting the first signal to a station, wherein the network group, after entry of the access point, includes two or more access points; and
perform control of receiving from the station a network group setup complete notification in a case where another access point has entered the network group.

15. The wireless communication device according to claim 14, wherein
the first signal further includes network identification information for identifying the network group to which the wireless communication device itself belongs.

16. The wireless communication device according to claim 15, wherein
the first signal further includes information indicating a configuration of the network group to which the wireless communication device itself belongs.

17. The wireless communication device according to claim 14, wherein
the processing circuitry is configured to perform control of receiving a second signal that is transmitted from the station in response to the first signal, and that includes the access point identification information, and includes network identification information for identifying the network group to which the wireless communication device itself makes an entry.

18. The wireless communication device according to claim 17, wherein
in the case of making an entry to the network group in response to the second signal, the processing circuitry is configured to generate a third signal for confirming the entry to the network group, and to perform control of transmitting the third signal to the station.

19. A non-transitory computer readable medium storing instructions that, when executed by processing circuitry, perform a wireless communication method comprising:
receiving a first signal that includes access point identification information for identifying an access point that configures a network group according to a user's instruction, the first signal being received from the access point;
generating a second signal that includes the access point identification information, and includes network identification information for identifying an access-point network group to which the access point makes an entry;
transmitting the second signal to the access point, wherein the network group, after entry of the access point, includes two or more access points; and
transmitting a network group setup complete notification to access points excluding the access point to which the second signal has been transmitted, among access points each belonging to the network group.

* * * * *